United States Patent
Singh (10) Patent No.: US 10,504,241 B2
(45) Date of Patent: Dec. 10, 2019

(54) VEHICLE CAMERA CALIBRATION SYSTEM

(71) Applicant: MAGNA ELECTRONICS INC., Auburn Hills, MI (US)

(72) Inventor: Jagmal Singh, Aschaffenburg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 60 days.

(21) Appl. No.: 15/844,995

(22) Filed: Dec. 18, 2017

(65) Prior Publication Data
US 2018/0174327 A1 Jun. 21, 2018

Related U.S. Application Data

(60) Provisional application No. 62/435,995, filed on Dec. 19, 2016.

(51) Int. Cl.
*G06T 7/80* (2017.01)
*B60R 1/00* (2006.01)

(52) U.S. Cl.
CPC .................. *G06T 7/80* (2017.01); *B60R 1/00* (2013.01); *B60R 2300/105* (2013.01); *B60R 2300/402* (2013.01); *G06T 2207/10028* (2013.01); *G06T 2207/30252* (2013.01)

(58) Field of Classification Search
CPC ............. G06T 7/80; G06T 2207/10028; G06T 2207/30252; B60R 1/00; B60R 2300/105; B60R 2300/402
USPC ........................................................ 348/148
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 7,914,187 B2 | 3/2011 | Higgins-Luthman et al. |
| 7,949,486 B2 | 5/2011 | Denny et al. |
| 8,421,865 B2 | 4/2013 | Euler et al. |
| 9,150,155 B2 | 10/2015 | Vico et al. |
| 9,205,776 B2 | 12/2015 | Turk |

(Continued)

OTHER PUBLICATIONS

Van Hamme et al., "Robust monocular visual odometry for road vehicles using uncertain perspective projection" EURASIP Journal on Image and Video Processing, Dec. 1, 2015.

*Primary Examiner* — Marnie A Matt
(74) *Attorney, Agent, or Firm* — Honigman LLP (57) ABSTRACT

A camera calibration system for cameras of a vehicle includes a plurality of cameras disposed at a vehicle and having respective fields of view exterior of the vehicle, with the fields of view of two of the cameras overlapping. While the vehicle is moving, an image processor of a control processes image data captured by the two cameras to determine and track matching features in an overlapping region of the fields of view of the two cameras. The control, responsive to image processing of image data captured by the two cameras, determines motion of matching features and minimizes a cost function of the error in the matching of the features. The camera calibration system uses the determined minimized cost function to refine calibration results of the two cameras using a feedback loop.

20 Claims, 6 Drawing Sheets

(56) References Cited

U.S. PATENT DOCUMENTS

| | | |
|---|---|---|
| 9,357,208 B2 | 5/2016 | Gupta et al. |
| 9,491,450 B2 | 11/2016 | Kussel |
| 9,491,451 B2 | 11/2016 | Pliefke |
| 9,563,951 B2 | 2/2017 | Okouneva |
| 9,688,200 B2 | 6/2017 | Knudsen |
| 9,723,272 B2 | 8/2017 | Lu et al. |
| 9,762,880 B2 | 9/2017 | Pflug |
| 9,834,153 B2 | 12/2017 | Gupta et al. |
| 2010/0121577 A1* | 5/2010 | Zhang ............... G06K 9/00798 701/301 |
| 2012/0224064 A1* | 9/2012 | Euler ..................... B60R 1/00 348/148 |
| 2013/0107048 A1* | 5/2013 | Rottner ............ H04N 5/23238 348/148 |
| 2013/0223522 A1* | 8/2013 | Song ................... H04N 19/523 375/240.03 |
| 2013/0286193 A1* | 10/2013 | Pflug ..................... B60R 1/00 348/135 |
| 2013/0314503 A1* | 11/2013 | Nix .................... G06K 9/00805 348/46 |
| 2014/0118491 A1* | 5/2014 | Tourapis ............... H04N 19/00 348/43 |
| 2014/0169627 A1 | 6/2014 | Gupta |
| 2014/0176605 A1 | 6/2014 | Gibson et al. |
| 2014/0247352 A1* | 9/2014 | Rathi ..................... B60R 1/00 348/148 |
| 2014/0247354 A1 | 9/2014 | Knudsen |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |
| 2015/0002670 A1 | 1/2015 | Bajpai |
| 2015/0012708 A1* | 1/2015 | Rubinstein .......... G06F 15/8015 711/125 |
| 2015/0049193 A1 | 2/2015 | Gupta et al. |
| 2015/0175072 A1 | 6/2015 | Sabeti |
| 2015/0178576 A1 | 6/2015 | Gupta |
| 2015/0291215 A1 | 10/2015 | Bajpai et al. |
| 2016/0044284 A1 | 2/2016 | Goseberg et al. |
| 2016/0137126 A1 | 5/2016 | Fursich et al. |
| 2016/0148062 A1 | 5/2016 | Fursich |
| 2016/0176343 A1 | 6/2016 | Sakano et al. |
| 2016/0180182 A1 | 6/2016 | Gupta et al. |
| 2016/0210750 A1 | 7/2016 | Singh et al. |
| 2016/0335510 A1 | 11/2016 | Gupta et al. |
| 2017/0050672 A1 | 2/2017 | Gieseke et al. |
| 2017/0185851 A1* | 6/2017 | Jeromin ............. G06K 9/00208 |
| 2017/0278270 A1 | 9/2017 | Singh et al. |
| 2017/0372527 A1* | 12/2017 | Murali .................... G01S 17/00 |
| 2018/0053322 A1 | 2/2018 | Singh et al. |
| 2018/0165816 A1* | 6/2018 | Bellis ........................ G06T 7/20 |
| 2018/0174327 A1 | 6/2018 | Singh |
| 2018/0281698 A1 | 10/2018 | Tang et al. |
| 2018/0286078 A1* | 10/2018 | Kimoto .................. H04N 7/183 |
| 2018/0299533 A1 | 10/2018 | Pliefke et al. |

\* cited by examiner

VEHICLE CAMERA CALIBRATION SYSTEM

CROSS REFERENCE TO RELATED APPLICATION

The present application claims the filing benefits of U.S. provisional application Ser. No. 62/435,995, filed Dec. 19, 2016, which is hereby incorporated herein by reference in its entirety.

FIELD OF THE INVENTION

The present invention relates generally to a vehicle vision system for a vehicle and, more particularly, to a vehicle vision system that utilizes two or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

In a surround view system, cameras are mounted on front, rear, left and right side of the vehicle, and images from all four (or more) cameras are stitched to generate a top-view/bowl-view/3D view or the like. The quality of stitching of the images for display is generally poor due to offsets in camera actual position and orientation after assembly and installation of the system. Stitching quality is improved by calibrating extrinsic parameters of all cameras (using offline or online calibration methods). A metric is typically desired to have the online objective evaluation of stitching quality and this metric can be used as an output for the user, as well as an input for further improving the stitching quality.

To calibrate the cameras, the subject vehicle may be placed on a flat surface with pre-defined target laid over the stitching region(s). Images of the target are captured by the cameras and are analyzed in the top view to get a metric or confidence value for stitching quality. In some cases, the camera is calibrated in such a way to achieve best stitching quality offline.

SUMMARY OF THE INVENTION

The present invention provides a driver assistance system or vision system or imaging system for a vehicle that utilizes two or more cameras (preferably two or more CMOS cameras) to capture image data representative of images exterior of the vehicle, and provides dynamic calibration of vehicle cameras using stitching quality evaluation in a feedback loop.

In accordance with an aspect of the present invention, the camera calibration system includes a plurality of cameras disposed at a vehicle and having respective fields of view exterior of the vehicle, with the fields of view of at least two of the cameras overlapping. An image processor is operable to process image data captured by the cameras and, while the vehicle is moving, the image processor processes image data of the two cameras to determine and track matching features in an overlapping region of the fields of view of the two cameras. The image processor determines motion of matching features and minimizes a cost function of the error in the matching of the features. The camera calibration system uses the determined minimized cost function to refine calibration results of the cameras using a feedback loop. The determined minimized cost function and feedback loop may also be used to enhance stitching of image data captured by the cameras to provide enhanced display of stitched images derived from image data captured by at least two of the cameras for viewing by a driver of the vehicle during a driving maneuver (such as during a reversing maneuver or parking maneuver or trailering maneuver or the like).

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
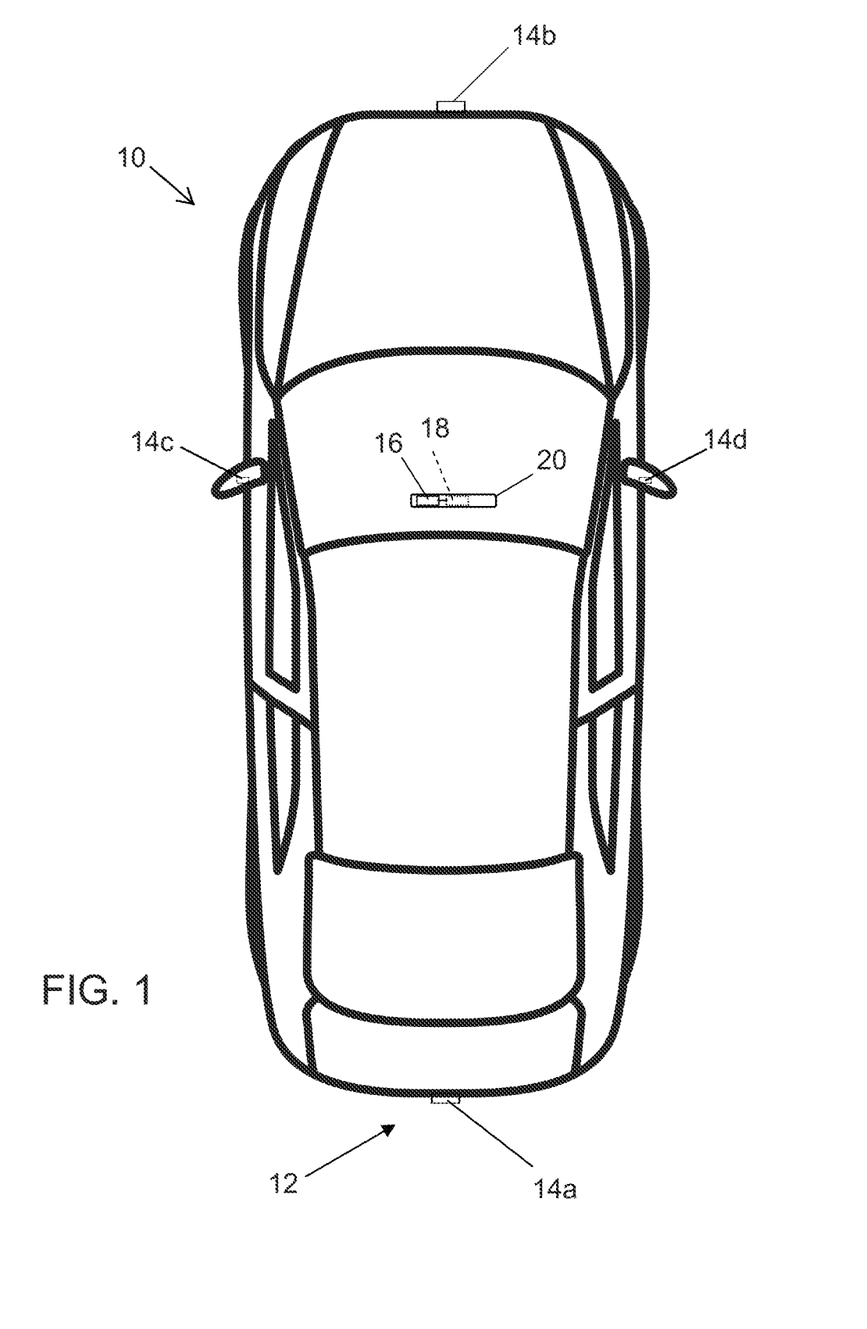
FIG. 1 is a plan view of a vehicle with a vision system that incorporates cameras in accordance with the present invention.
Figure 4:
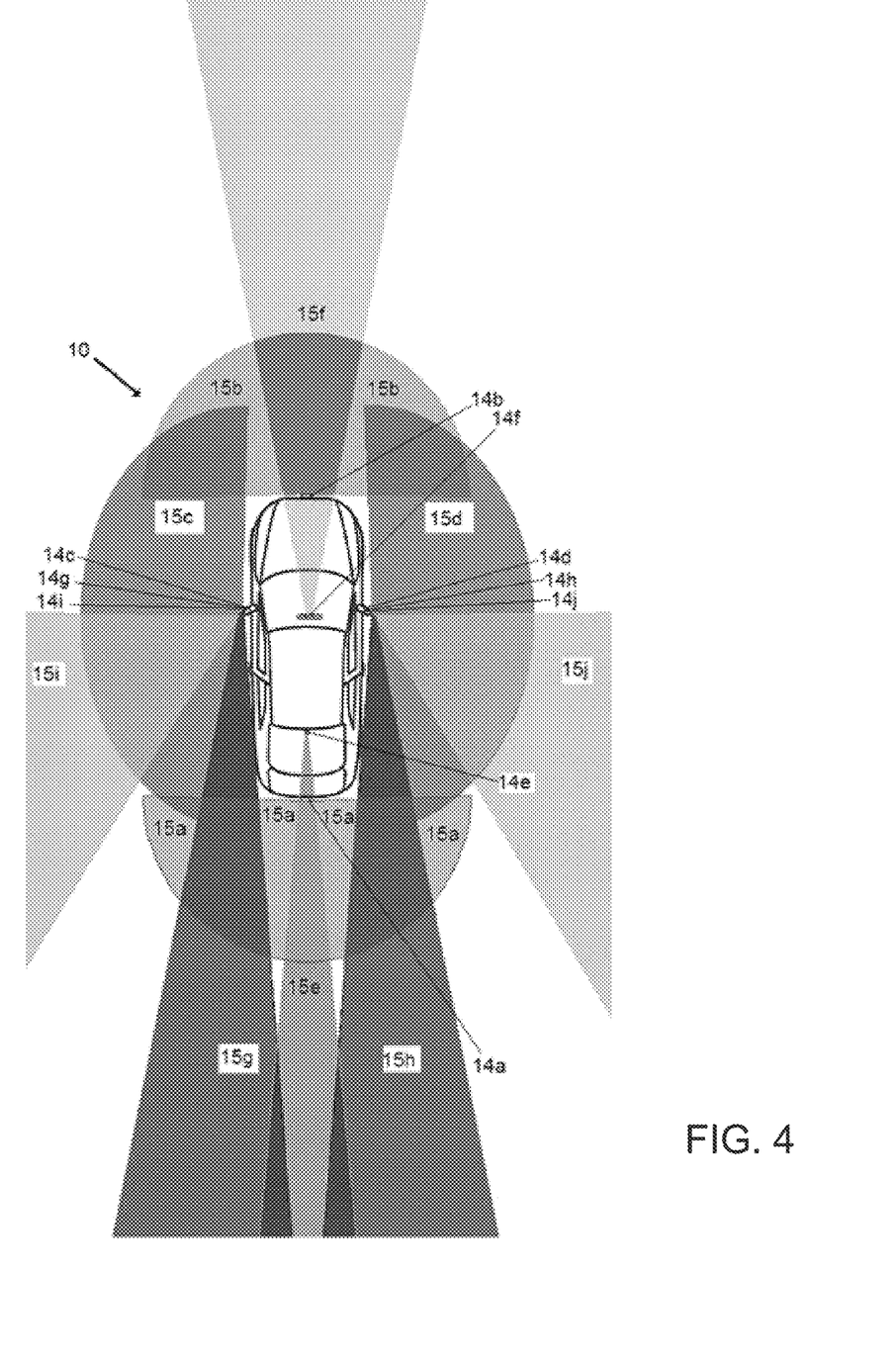
FIG. 4 is a plan view of a vehicle having multiple cameras for different image capture, and showing the areas encompassed by the fields of view of the cameras.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). Optionally, more cameras may be disposed at the vehicle to provide different viewing regions around the vehicle, such as shown in FIG. 4 and discussed below. The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

In U.S. Publication No. US-2014-0247352 (which is hereby incorporated herein by reference in its entirety), the calibration of the camera extrinsic parameters is described by using objects (or feature points) flowing through the camera's view. A transfer map is adapted so that the object feature points follow a straight line when the subject vehicle is driven straight. Also, the elevation of regions in view may be dynamically compensated by that method. No 3D map gets generated.

The system of the present invention is operable to use structure from motion (SfM) of the ground structure flowing through the cameras' views while the subject vehicle is in motion for stitching quality evolution and use the results of that evaluation for camera and/or system calibration. A 3D point cloud may be generated using SfM in the field of view of all of the cameras. The 3D point cloud may be matched over the overlapping areas (see FIG. 2) from two adjacent cameras. A metric of the match may be defined for an objective stitching quality evaluation.

Figure 2:
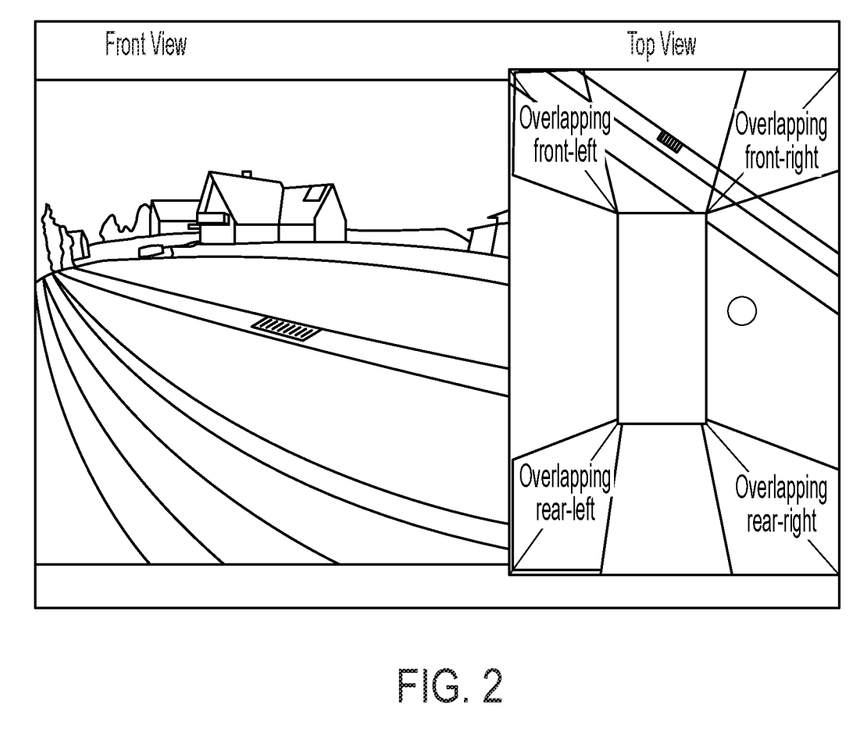
FIG. 2 is an image showing a display of a vehicle equipped with the system of the present invention, showing a top plan view or bird's eye view of the vehicle surroundings and a front view of a forward viewing camera of the vehicle.

As shown in FIG. 2, a display of the vehicle may display both a top view and a front view (or rear or side view) to display images of the regions at or near or surrounding the vehicle for viewing by the driver, such as during a parking maneuver or the like of the vehicle. The overlapping areas of a four camera system are shown in the top view of FIG. 2, and the system may define a cost function. Minimization of the cost-function of feature matching in overlapping areas is used as an input for calibration in a feedback loop.

Figure 3:
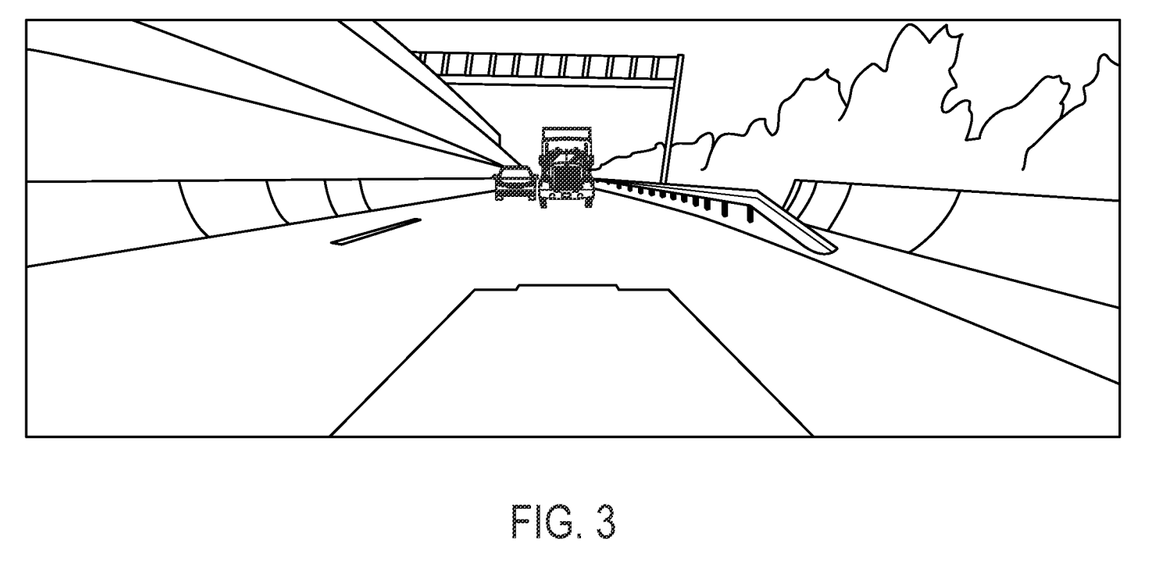
FIG. 3 is a panoramic rear view displayed image comprising image portions from two side cameras and one rear camera, with both side cameras having imager long side shifted lenses and the rear camera having a fisheye lens.
Figure 5:
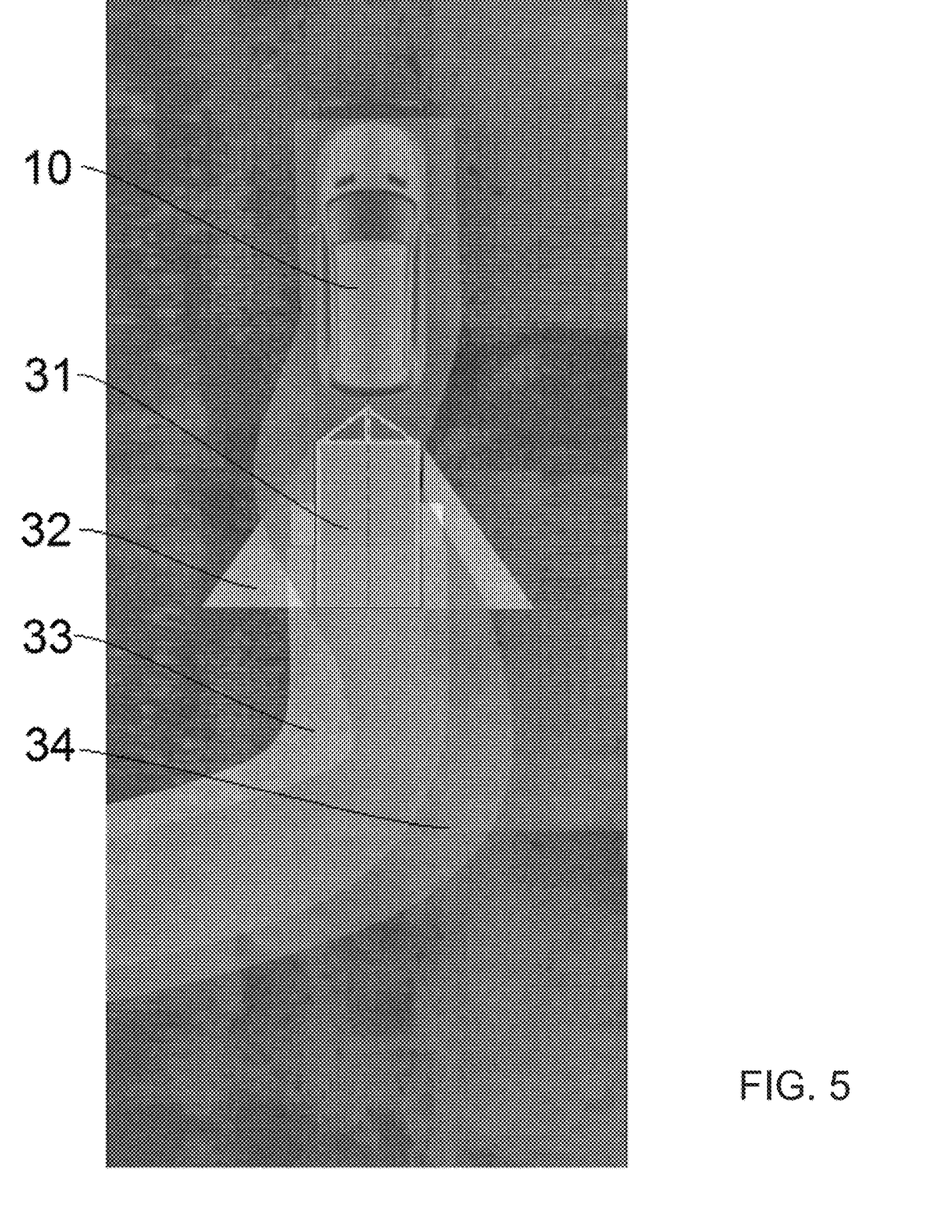
FIG. 5 is a plan view of a vehicle with a trailer, showing paths of the vehicle and trailer during a rearward turning maneuver.
Figure 6:
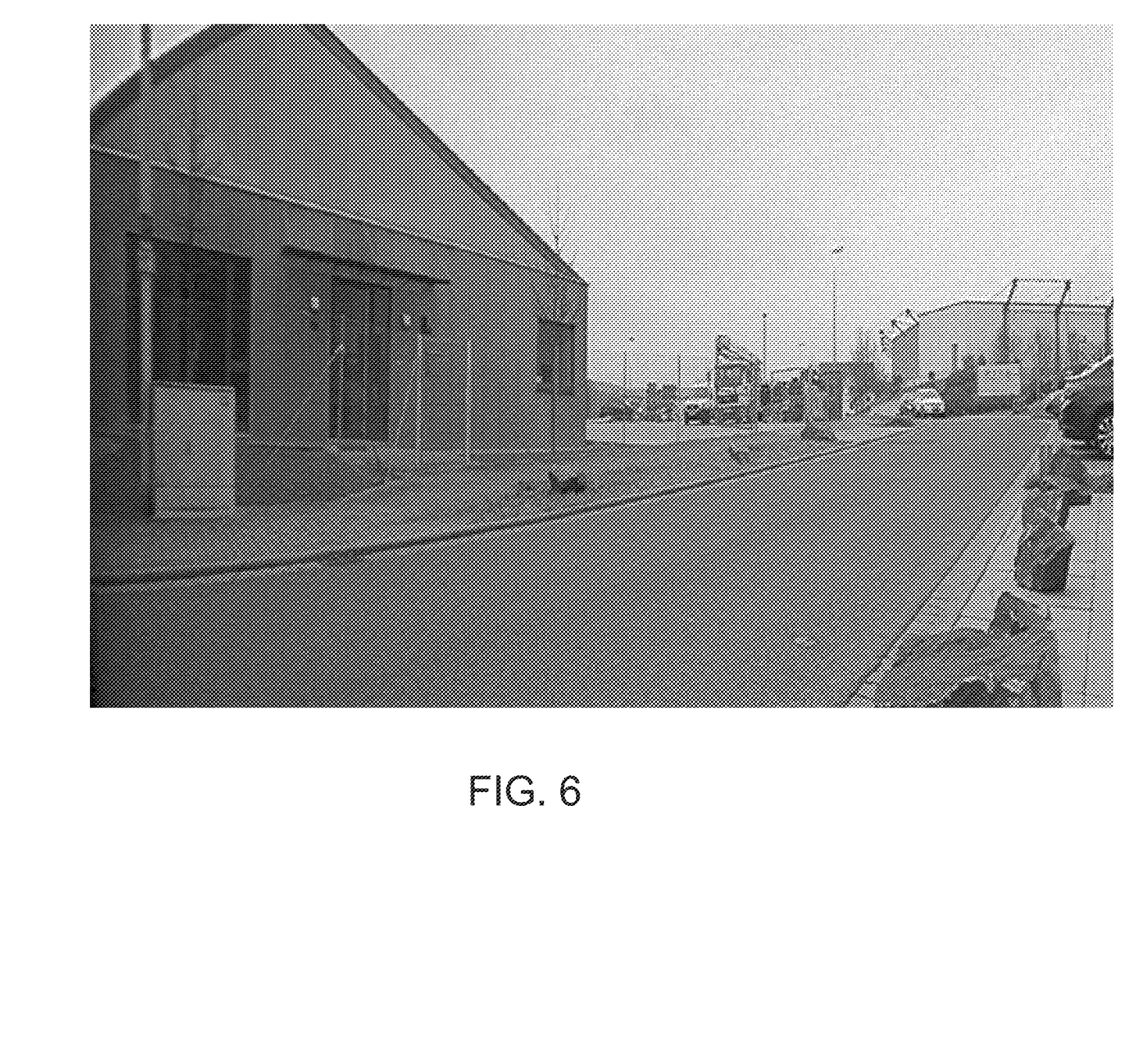
FIG. 6 is an image of a rearward and sideward view as captured by one or more rearward and sideward viewing cameras at the vehicle.

In accordance with the present invention, a minimization procedure or minimization cost function of the error in the 3D point cloud matching may be used to refine the calibration results of the cameras using a feedback loop, which in turn will improve the stitching quality and vice-versa. The method may not be limited to the calibration of four cameras but may also find use in systems with more cameras such as for vehicle vision and vision processing systems having multiple (outbound) camera systems. For example, the system may include ten cameras (such as shown in FIG. 4), which contribute to one or multiple stitched goal images, such as generating surround view vision views, rear view panorama view images such as shown in FIG. 3, side mirror (replacement) views and optionally blind spot view images, such as shown in FIG. 6, cross traffic view images, or specific views for guiding trailer docking maneuvers, vehicle parking or trailer rearward maneuvering, such as shown in FIG. 5, trailer parking or forward driving trailer (curve) assist. For example, FIG. 5 shows the detected environmental scene with the vehicle overlay 10 of the vehicle and the trailer overlay 31, and an overlay of an area inserted to the real time image by historical data (non-real time) content 32, since it is not captured by any sensor or camera, and with overlays of a planned vehicle reversing path 34 and the trailer's reversing path 33 (such as by utilizing aspects of the trailer parking assist systems described in U.S. Publication No. US-2017-0050672, which is hereby incorporated herein by reference in its entirety).

The example's ten cameras on a vehicle 10 such as shown in FIG. 4 may include a ADAS forward vision camera 14f, a front grill fisheye camera 14b, two side mirror mounted (far-) rearview cameras (including a left side camera 14g and a right side camera 14h), two side mirror mounted surround vision fish eye cameras (including a left side camera 14c and a right side camera 14d), two side mirror mounted blind spot cameras (including a left side camera 14i and a right side camera 14j), one rearward directed fisheye camera at the rear center of the vehicle 14a and a (far-) vision rear view camera, mounted at the rear of the vehicle behind the rear window, such as, for example, mounted in the area of the third rear light 14e (such as at or near a center high mounted stop lamp of the vehicle). Each of the cameras 14a-j has a respective field of view 15a-j, as shown in FIG. 4.

Thus, the system of the present invention may process image data captured by two or more cameras with overlapping fields of view while the vehicle is moving to determine motion of features and matching features in the overlapping regions. The calibration process minimizes a cost function of the error in the matching of features (such as 3D point cloud matching) and uses those results to refine calibration results of the cameras using a feedback loop, which in turn improves the stitching quality of the stitched images that are stitched together for display at a display screen in the vehicle for viewing by the driver of the vehicle during a driving maneuver.

The system may utilize aspects of the systems described in U.S. Publication Nos. US-2017-0050672; US-2016-0137126; US-2016-0148062 and/or US-2016-0044284, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera calibration system for vehicular cameras, said camera calibration system comprising:

a plurality of cameras disposed at a vehicle, with each camera of the plurality of cameras having a respective field of view exterior of the vehicle, wherein the fields of view of two of said cameras overlap;

a control having an image processor operable to process image data captured by said cameras;

wherein said image processor processes image data captured by said two cameras having overlapping fields of view to determine at least one matching feature of an object present at an overlapping region of the fields of view of said two cameras;

wherein, while the vehicle is moving, said image processor processes multiple frames of image data captured by said two cameras having overlapping fields of view to track the at least one matching feature of the object present in the overlapping region of the fields of view of said two cameras;

wherein said control, responsive to image processing by said image processor of multiple frames of image data captured by said two cameras having overlapping fields of view, determines motion of at least one matching feature of the object and minimizes a cost function of an error in the matching of the at least one feature of the object; and wherein said camera calibration system uses the determined minimized cost function to refine calibration of said two cameras using a feedback loop.

2. The camera calibration system of claim 1, comprising a display screen disposed in the vehicle for displaying video images derived from image data captured by said cameras for viewing by a driver of the vehicle during a driving maneuver of the vehicle.

3. The camera calibration system of claim 2, wherein images derived from image data captured by adjacent pairs of said cameras are stitched together for display at said display screen for viewing by the driver of the vehicle during a driving maneuver.

4. The camera calibration system of claim 3, wherein the determined minimized cost function and the feedback loop are used to improve stitching quality of the stitched images for display at said display screen for viewing by the driver of the vehicle during a driving maneuver.

5. The camera calibration system of claim 1, wherein said plurality of cameras comprises at least four cameras for a surround view vision system of the vehicle.

6. The camera calibration system of claim 5, wherein said two cameras comprises a rearward viewing camera disposed at a rear of the vehicle and a sideward and rearward viewing camera disposed at a side of the vehicle.

7. The camera calibration system of claim 1, wherein said plurality of cameras comprises multiple cameras disposed at the rear of the vehicle and multiple cameras disposed at each side of the vehicle.

8. The camera calibration system of claim 1, wherein said control uses structure from motion of the ground structure moving through the fields of view of said two cameras while the vehicle is moving to generate a three dimensional point cloud.

9. The camera calibration system of claim 8, wherein the generated three dimensional point cloud provides features that are present at the overlapping region of the fields of view of said two cameras.

10. A camera calibration system for vehicular cameras, said camera calibration system comprising:

a plurality of cameras disposed at a vehicle;

wherein said plurality of cameras comprises a rear camera disposed at a rear portion of the vehicle and having a field of view rearward of the vehicle, a driver-side camera disposed at a driver side of the vehicle and having a field of view sideward and rearward at the driver side of the vehicle, and a passenger-side camera disposed at a passenger side of the vehicle and having a field of view sideward and rearward at the passenger side of the vehicle;

wherein the fields of view of said rear camera and said driver-side camera overlap at a first overlapping region;

wherein the fields of view of said rear camera and said passenger-side camera overlap at a second overlapping region;

a control having an image processor operable to process image data captured by said rear camera, said driver-side camera and said passenger-side camera;

wherein said image processor processes image data captured by said rear camera and said driver-side camera to determine at least one matching feature of an object present at the first overlapping region of the fields of view of said rear camera and said driver-side camera;

wherein said image processor processes image data captured by said rear camera and said passenger-side camera to determine at least one matching feature of an object present at the second overlapping region of the fields of view of said rear camera and said passenger-side camera;

wherein, while the vehicle is moving, said image processor processes multiple frames of image data captured by said rear camera and said driver-side camera to track the at least one matching feature of the object present in the first overlapping region of the fields of view of said rear camera and said driver-side camera;

wherein, while the vehicle is moving, said image processor processes multiple frames of image data captured by said rear camera and said passenger-side camera to track the at least one matching feature of the object present in the second overlapping region of the fields of view of said rear camera and said passenger-side camera;

wherein said control, responsive to image processing by said image processor of multiple frames of image data captured by said rear camera and said driver-side camera, determines motion of at least one matching feature of the object present in the first overlapping region of the fields of view of said rear camera and said driver-side camera and minimizes a first cost function of an error in the matching of the at least one feature of the object present in the first overlapping region of the fields of view of said rear camera and said driver-side camera;

wherein said control, responsive to image processing by said image processor of multiple frames of image data captured by said rear camera and said passenger-side camera, determines motion of at least one matching feature of the object present in the second overlapping region of the fields of view of said rear camera and said passenger-side camera and minimizes a second cost function of an error in the matching of the at least one feature of the object present in the second overlapping region of the fields of view of said rear camera and said passenger-side camera; and wherein said camera calibration system uses the determined minimized first and second cost functions to refine calibration of said rear camera, said driver-side camera and said passenger-side camera using at least one feedback loop.

11. The camera calibration system of claim 10, comprising a display screen disposed in the vehicle for displaying video images derived from image data captured by said cameras for viewing by a driver of the vehicle during a driving maneuver of the vehicle.

12. The camera calibration system of claim 11, wherein images derived from image data captured by said rear camera and said driver-side camera are stitched together and images derived from image data captured by said rear camera and said passenger-side camera are stitched together for display at said display screen for viewing by the driver of the vehicle during the driving maneuver of the vehicle.

13. The camera calibration system of claim 12, wherein the determined minimized first and second cost function and the at least one feedback loop are used to improve stitching quality of the stitched images for display at said display screen for viewing by the driver of the vehicle during the driving maneuver of the vehicle.

14. The camera calibration system of claim 10, wherein said plurality of cameras comprises a front camera disposed at a front portion of the vehicle and having a forward field of view, and wherein images derived from image data captured by said rear camera, said driver-side camera, said front camera and said passenger-side camera are stitched together and displayed for a surround view vision system of the vehicle.

15. The camera calibration system of claim 10, wherein said plurality of cameras comprises multiple rear cameras disposed at the rear portion of the vehicle and having rearward fields of view, multiple driver-side cameras disposed at the driver side of the vehicle, and multiple passenger-side cameras disposed at the passenger side of the vehicle.

16. A camera calibration system for vehicular cameras, said camera calibration system comprising:

a plurality of cameras disposed at a vehicle;

wherein said plurality of cameras comprises a rear camera disposed at a rear portion of the vehicle and having a field of view rearward of the vehicle, a driver-side camera disposed at a driver side of the vehicle and having a field of view sideward and rearward at the driver side of the vehicle, and a passenger-side camera disposed at a passenger side of the vehicle and having a field of view sideward and rearward at the passenger side of the vehicle;

wherein the fields of view of said rear camera and said driver-side camera overlap at a first overlapping region;

wherein the fields of view of said rear camera and said passenger-side camera overlap at a second overlapping region;

a control having an image processor operable to process image data captured by said rear camera, said driver-side camera and said passenger-side camera;

wherein said image processor processes image data captured by said rear camera and said driver-side camera to determine at least one matching feature of an object present at the first overlapping region of the fields of view of said rear camera and said driver-side camera;

wherein said image processor processes image data captured by said rear camera and said passenger-side camera to determine at least one matching feature of an object present at the second overlapping region of the fields of view of said rear camera and said passenger-side camera;

wherein, while the vehicle is moving, said image processor processes multiple frames of image data captured by said rear camera and said driver-side camera to track the at least one matching feature of the object present in the first overlapping region of the fields of view of said rear camera and said driver-side camera;

wherein, while the vehicle is moving, said image processor processes multiple frames of image data captured by said rear camera and said passenger-side camera to track the at least one matching feature of the object present in the second overlapping region of the fields of view of said rear camera and said passenger-side camera;

wherein said control uses structure from motion of the ground structure moving through the fields of view of said rear camera and said driver-side camera while the vehicle is moving to generate a first three dimensional point cloud, and wherein said control uses structure from motion of the ground structure moving through the fields of view of said rear camera and said passenger-side camera while the vehicle is moving to generate a second three dimensional point cloud;

wherein the generated three dimensional point clouds provide features that are present at respective overlapping regions of the fields of view of adjacent ones of said cameras;

wherein said control, responsive to image processing by said image processor of multiple frames of image data captured by said rear camera and said driver-side camera, determines motion of matching features of the object present in the first overlapping region of the fields of view of said rear camera and said driver-side camera and minimizes a first cost function of an error in the matching of the features of the object present in the first overlapping region of the fields of view of said rear camera and said driver-side camera;

wherein said control, responsive to image processing by said image processor of multiple frames of image data captured by said rear camera and said passenger-side camera, determines motion of matching features of the object present in the second overlapping region of the fields of view of said rear camera and said passenger-side camera and minimizes a second cost function of an error in the matching of the features of the object present in the second overlapping region of the fields of view of said rear camera and said passenger-side camera; and wherein said camera calibration system uses the determined minimized first and second cost functions to refine calibration of said rear camera, said driver-side camera and said passenger-side camera using at least one feedback loop.

17. The camera calibration system of claim 16, comprising a display screen disposed in the vehicle for displaying video images derived from image data captured by said cameras for viewing by a driver of the vehicle during a driving maneuver of the vehicle.

18. The camera calibration system of claim 17, wherein images derived from image data captured by said rear camera and said driver-side camera are stitched together and images derived from image data captured by said rear camera and said passenger-side camera are stitched together for display at said display screen for viewing by the driver of the vehicle during the driving maneuver of the vehicle.

19. The camera calibration system of claim 18, wherein the determined minimized first and second cost function and the at least one feedback loop are used to improve stitching quality of the stitched images for display at said display screen for viewing by the driver of the vehicle during the driving maneuver of the vehicle.

20. The camera calibration system of claim 16, wherein said plurality of cameras comprises multiple rear cameras disposed at the rear portion of the vehicle and having rearward fields of view, multiple driver-side cameras disposed at the driver side of the vehicle, and multiple passenger-side cameras disposed at the passenger side of the vehicle.

* * * * *